No. 648,313. Patented Apr. 24, 1900.
J. K. THOMA.
WIRE FENCE GATE.
(Application filed Apr. 5, 1899.)
(No Model.)
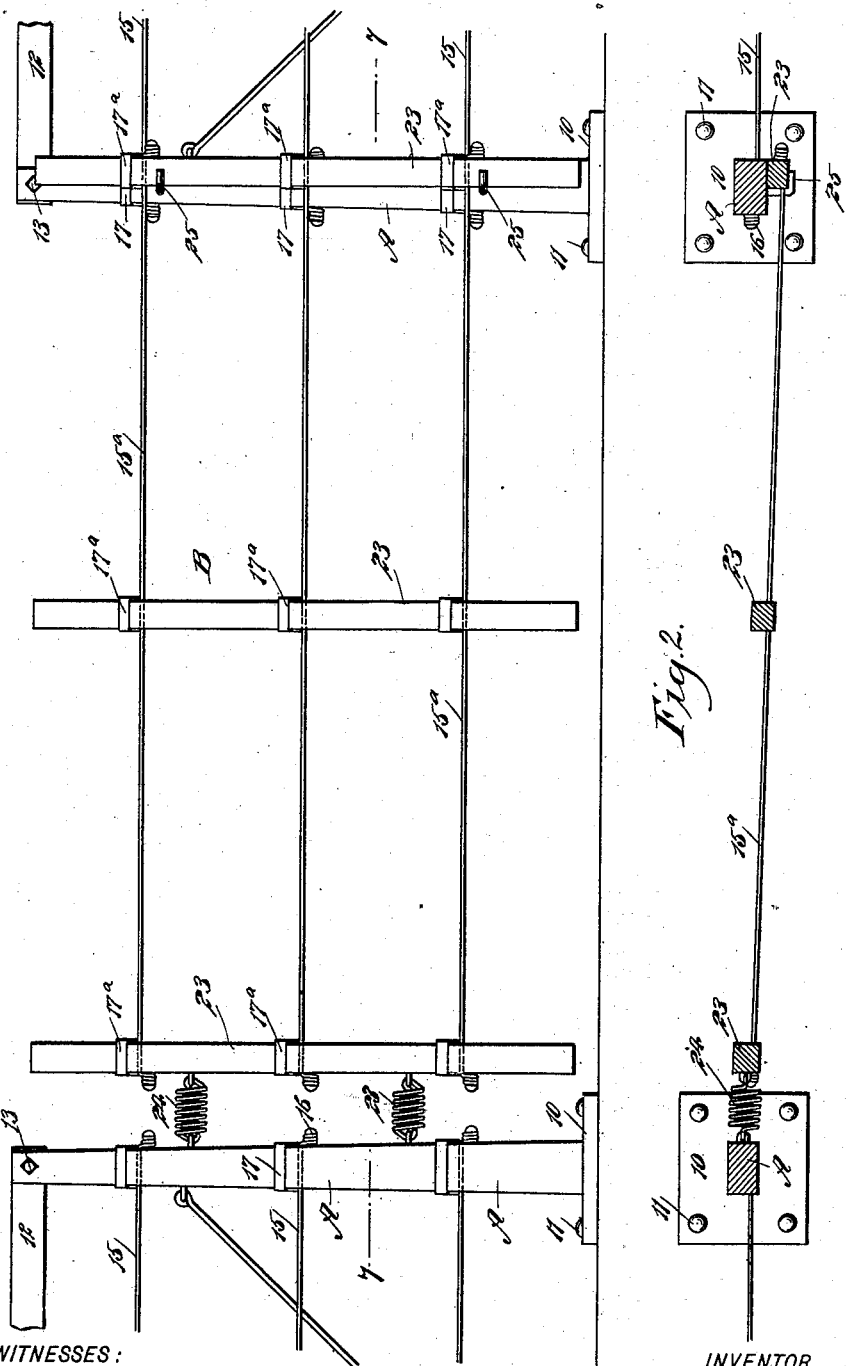
WITNESSES:
INVENTOR
James K. Thoma.
BY
ATTORNEYS.

UNITED STATES PATENT OFFICE.

JAMES K. THOMA, OF WINFIELD, KANSAS.

WIRE-FENCE GATE.

SPECIFICATION forming part of Letters Patent No. 648,313, dated April 24, 1900.

Application filed April 5, 1899. Serial No. 711,817. (No model.)

*To all whom it may concern:*

Be it known that I, JAMES K. THOMA, of Winfield, in the county of Cowley and State of Kansas, have invented a new and useful Improvement in Fences, of which the following is a full, clear, and exact description.

The purpose of this invention is to provide a gate adapted especially for wire fences, the construction being such that the gate appears as a continuation of the fence.

This specification is the disclosure of one form of my invention, while the claims define the actual scope thereof.

Reference is to be had to the accompanying drawings, forming a part of this specification, in which similar characters of reference indicate corresponding parts in both views.

Figure 1 is a side elevation, and Fig. 2 is a horizontal section on the line 7 7 of Fig. 1.

Two gate-posts A are provided, which may form part of the fence, the fence consisting in running-wires 15, held in slots in the posts A by means of wedges 17. Top bars 12 may be provided for the posts A, as shown, and fastened thereto by bolts or rivets 13. The wires may be further secured to the posts A, if so desired, by means of staples, pins, or the like 16, as shown.

The gate B is constructed of one or more uprights 23, to which running-wires 15ª are secured by wedges 17ª, similar to the wedges 17. The upright 23 at the inner end of the gate is connected to the adjacent post A by retractile spiral springs 24, and the other post A is provided with hooks 25, with which the outer end upright 23 may be engaged, as shown, to hold the gate in closed position. When so arranged, the retractile springs 24 draw the said outer end upright 23 firmly against the hooks 25 and hold the gate in closed position. To release the gate, it may be moved outward against the tension of the springs 24, so as to disengage the outer end upright 23 of the hooks 25, thus permitting the gate to be opened.

Having thus described my invention, I claim as new and desire to secure by Letters Patent—

1. The combination of two gate-posts, a gate, a spring connecting one end of the gate with one of the posts, and a keeper secured to the other post and adapted to hold the other end of the gate, the keeper serving to hold the gate in position to maintain the spring under tension.

2. The combination with two posts, of a gate, a retractile spring attached to one post and to one end of the gate, and a keeper in the form of a hook secured to the other post and adapted to be engaged by the gate to hold the spring under tension, whereby the gate is held in closed position.

JAMES K. THOMA.

Witnesses:
   H. B. MILLER,
   J. W. ESSLER.